US012503795B2

(12) United States Patent
Narita et al.

(10) Patent No.: US 12,503,795 B2
(45) Date of Patent: Dec. 23, 2025

(54) CARBON FIBER PRECURSOR FIBER, FIBER FOR CARBON FIBER PRECURSOR FIBER, METHOD OF PRODUCING CARBON FIBER PRECURSOR FIBER, METHOD OF PRODUCING STABILIZED FIBER, AND METHOD OF PRODUCING CARBON FIBER

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Mamiko Narita, Nagakute (JP); Mitsumasa Matsushita, Nagakute (JP); Takuya Morishita, Nagakute (JP); Natsu Sakakura, Nagakute (JP); Akira Kunitomo, Toyota (JP); Nozomu Shigemitsu, Toyota (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 701 days.

(21) Appl. No.: 17/965,946

(22) Filed: Oct. 14, 2022

(65) Prior Publication Data

US 2023/0126217 A1 Apr. 27, 2023

(30) Foreign Application Priority Data

Oct. 26, 2021 (JP) ................................ 2021-174717
Aug. 23, 2022 (JP) ................................ 2022-132729

(51) Int. Cl.

| | |
|---|---|
| ***D01F 9/21*** | (2006.01) |
| ***C01B 32/05*** | (2017.01) |
| ***D01F 6/28*** | (2006.01) |
| ***D06M 15/643*** | (2006.01) |
| ***D06M 101/26*** | (2006.01) |

(52) U.S. Cl.

CPC ................ *D01F 9/21* (2013.01); *C01B 32/05* (2017.08); *D01F 6/28* (2013.01); *D06M 15/6433* (2013.01); *D06M 2101/26* (2013.01)

(58) Field of Classification Search

CPC ..... D01F 9/21; D01F 6/28; D01F 6/38; D01F 9/00; D01F 9/08; D01F 9/12; D01F 9/14; D01F 9/32; D01F 9/324; D01F 9/326; D01F 9/328; D01F 11/00; D01F 11/02; D01F 11/04; D01F 11/06; D01F 11/08; D01F 11/10; D01F 11/12; D01F 11/121; D01F 11/122; D01F 11/123; D01F 11/124; D01F 11/125; D01F 11/126; D01F 11/127; D01F 11/128; D01F 11/129; D01F 11/14; D01F 11/16; C01B 32/05; D06M 15/6433; D06M 2101/26; D06M 10/10; D06M 15/65

See application file for complete search history.

(56) References Cited

U.S. PATENT DOCUMENTS

| | | | | |
|---|---|---|---|---|
| 2008/0152574 | A1* | 6/2008 | Tanaka ................ | D06M 15/643 423/447.2 |
| 2018/0148563 | A1 | 5/2018 | Hayashida et al. | |
| 2019/0031800 | A1 | 1/2019 | Morishita et al. | |

FOREIGN PATENT DOCUMENTS

| | | | |
|---|---|---|---|
| JP | H03-40152 | B2 | 6/1991 |
| JP | H09-143824 | A | 6/1997 |
| JP | 2006-183159 | A | 7/2006 |
| JP | 2008-202208 | A | 9/2008 |
| JP | 2018-090791 | A | 6/2018 |
| JP | 2019-026827 | A | 2/2019 |
| JP | 2021-46629 | A | 3/2021 |

OTHER PUBLICATIONS

Dec. 3, 2024 Office Action issued in Japense Patent Application No. 2022-132729.

* cited by examiner

*Primary Examiner* — Daniel C. McCracken
(74) *Attorney, Agent, or Firm* — Oliff PLC

(57) ABSTRACT

The carbon fiber precursor fiber of the disclosure includes an acrylamide-based polymer fiber; and a self-crosslinked product of a self-crosslinking silicone oil on a surface of the acrylamide-based polymer fiber.

11 Claims, No Drawings

CARBON FIBER PRECURSOR FIBER, FIBER FOR CARBON FIBER PRECURSOR FIBER, METHOD OF PRODUCING CARBON FIBER PRECURSOR FIBER, METHOD OF PRODUCING STABILIZED FIBER, AND METHOD OF PRODUCING CARBON FIBER

CROSS-REFERENCE TO RELATED APPLICATIONS

This application claims priority under 35 USC 119 from Japanese Patent Application No. 2021-174717 filed on Oct. 26, 2021, and Japanese Patent Application No. 2022-132729 filed on Aug. 23, 2022, the disclosure of which is incorporated by reference herein in its entirety.

BACKGROUND

Technical Field

The present disclosure relates to a carbon fiber precursor fiber, a fiber for a carbon fiber precursor fiber, a method of producing a carbon fiber precursor fiber, a method of producing a stabilized fiber, and a method of producing a carbon fiber.

Related Art

Carbon fibers have attracted attention as materials for replacing metal materials in terms of the properties such as light weight, excellent mechanical strength, and resistance to corrosion.

As a method of producing a carbon fiber, there is known a method in which a silicone-based oil is applied to a chemical fiber obtained by spinning polyacrylonitrile, a heat treatment is performed to obtain a carbon fiber precursor fiber, and a fiber bundle obtained by bundling several hundred to several tens of thousands of carbon fiber precursor fibers that are single fibers is subjected to a stabilization treatment and then subjected to a carbonization treatment (for example, Japanese Patent Application Laid-Open (JP-A) No. 2006-183159 and Japanese Patent Application Laid-Open (JP-A) No. 2008-202208). JP-A No. 2006-183159 and JP-A No. 2008-202208 specifically disclose, as a silicone-based oil, a silicone-based oil prepared by diluting an oil including amino-modified silicone, epoxy-modified silicone, ethylene oxide-modified silicone, and an emulsifier with water.

On the other hand, an acrylamide-based polymer containing an acrylamide-based monomer is a water-soluble polymer, and is inexpensive when performing polymerization, spinning, and the like, and water having a low environmental impact can be used as a solvent, so that reduction in production cost of carbon fiber is expected.

JP-A No. 2018-90791 and JP-A No. 2019-26827 specifically disclose carbon fibers made by using the acrylamide-based polymer.

SUMMARY OF THE INVENTION

However, when a fiber bundle of carbon fiber precursor fibers obtained by applying a known silicone-based oil to single fibers of an acrylamide-based polymer is subjected to a stabilization treatment, the surface of the carbon fiber precursor fiber may be softened to obtain stabilized fibers in which the carbon fiber precursor fibers (single fibers) are fused to each other. When such stabilized fibers are subjected to a carbonization treatment, a portion where the carbon fiber precursor fibers are fused to each other burns to cause defects, and there is a possibility that the mechanical properties of the obtained carbon fibers are deteriorated. For this reason, there is a need for a carbon fiber precursor fiber capable of suppressing fusion between single fibers in the stabilization treatment.

Further, from the viewpoint of reducing the production cost of carbon fiber, there is a need for a carbon fiber precursor fiber capable of achieving a high carbonization yield.

The carbonization yield refers to a percentage of a value obtained by dividing the mass of carbon fiber by the mass of stabilized fiber.

According to an embodiment of the disclosure, there is provided a carbon fiber precursor fiber, a fiber for a carbon fiber precursor fiber, a method of producing a carbon fiber precursor fiber, a method of producing a stabilized fiber, and a method of producing a carbon fiber, which are capable of suppressing fusion between single fibers in a stabilization treatment while maintaining a high carbonization yield.

In order to solve the above problems, the present inventors have extensively conducted studies, and resultantly found that when a fiber bundle of carbon fiber precursor fibers obtained by applying a known silicone-based oil to single fibers of an acrylamide-based polymer is subjected to a stabilization treatment, a surface of the carbon fiber precursor fiber may be softened to cause the carbon fiber precursor fibers to be fused each other. In order to suppress this, the present inventors have found that by applying a self-crosslinking silicone oil to the surface of single fiber and by crosslinking (curing) the silicone oil, it is possible to suppress fusion between the single fibers in the stabilization treatment while maintaining a high carbonization yield, and have completed the disclosure.

Specific means for achieving the object are as follows.

<1> A carbon fiber precursor fiber, comprising:

an acrylamide-based polymer fiber; and a self-crosslinked product of a self-crosslinking silicone oil on a surface of the acrylamide-based polymer fiber.

<2> The carbon fiber precursor fiber according to <1>, wherein a content of the self-crosslinked product is from 0.1 parts by mass to 20 parts by mass with respect to 100 parts by mass of the acrylamide-based polymer fiber.

<3> The carbon fiber precursor fiber according to <1>, wherein:

the acrylamide-based polymer fiber is formed of an acrylamide-based polymer, and the acrylamide-based polymer contains 30 mol % or more of an acrylamide-based monomer unit with respect to all monomer units configuring the acrylamide-based polymer.

<4> The carbon fiber precursor fiber according to <3>, wherein the acrylamide-based polymer contains from 40 mol % to 99.8 mol % of the acrylamide-based monomer unit, from 0.1 mol % to 50 mol % of a vinyl cyanide monomer unit, and from 0.1 mol % to 30 mol % of an unsaturated carboxylic acid-based monomer unit with respect to all monomer units configuring the acrylamide-based polymer.

<5> The carbon fiber precursor fiber according to <1>, wherein the self-crosslinking silicone oil has an acrylic group or a methacrylic group.

<6> The carbon fiber precursor fiber according to <1>, wherein the self-crosslinking silicone oil has a viscosity of 9 $mm^2/s$ or more at 25° C.

<7> A fiber for carbon fiber precursor fiber, comprising:
an acrylamide-based polymer fiber; and
an uncrosslinked product of a self-crosslinking silicone oil on a surface of the acrylamide-based polymer fiber.

<8> A method of producing a carbon fiber precursor fiber, the method comprising:
subjecting the carbon fiber precursor fiber according to <7> to a crosslinking treatment.

<9> The method of producing a carbon fiber precursor fiber according to <8>, wherein the crosslinking treatment is an electron beam treatment.

<10> A method of producing a stabilized fiber, the method comprising:
subjecting the carbon fiber precursor fiber according to <1> to a stabilization treatment.

<11> A method of producing a carbon fiber, the method comprising:
obtaining a stabilized fiber by the method of producing a stabilized fiber according to <10>; and
subjecting the stabilized fiber to a carbonization treatment.

According to the disclosure, it is possible to provide a carbon fiber precursor fiber, a fiber for a carbon fiber precursor fiber, a method of producing a carbon fiber precursor fiber, a method of producing a stabilized fiber, and a method of producing a carbon fiber, which are capable of suppressing fusion between single fibers in a stabilization treatment while maintaining a high carbonization yield.

DETAILED DESCRIPTION OF THE INVENTION

In the disclosure, a numerical range indicated using "to" includes numerical values described before and after "to" as a minimum value and a maximum value, respectively.

In the numerical ranges described in stages in the disclosure, the upper limit value or the lower limit value described in one numerical range may be replaced with the upper limit value or the lower limit value of the numerical range described in another stage. In the numerical range described in the disclosure, the upper limit value or the lower limit value of the numerical range may be replaced with the values shown in the examples.

The term "step" herein includes not only an independent step but also a step that is not clearly distinguishable from other steps as long as the intended purpose of the step is achieved.

In the disclosure, each component may contain a plurality of corresponding substances. When a plurality of substances corresponding to each component are present in the carbon fiber precursor fiber, the content ratio or content of each component means the total content ratio or content of the plurality of substances present in the carbon fiber precursor fiber unless otherwise specified.

(1) Carbon Fiber Precursor Fiber

A carbon fiber precursor fiber of the disclosure includes an acrylamide-based polymer fiber; and a self-crosslinked product of a self-crosslinking silicone oil on a surface of the acrylamide-based polymer fiber.

In the disclosure, the "carbon fiber precursor fiber" refers to a fiber for producing a carbon fiber that has been subjected to a crosslinking treatment and has not been subjected to either a stabilization treatment or a carbonization treatment.

In the disclosure, the "acrylamide-based polymer fiber" refers to a single fiber made of an acrylamide-based polymer composition. The acrylamide-based polymer composition contains an acrylamide-based polymer, and may contain an additive component described later as necessary.

In the disclosure, the "acrylamide-based polymer" means a homopolymer of an acrylamide-based monomer or a copolymer of an acrylamide-based monomer and one or more other monomers other than the acrylamide-based monomer (hereinafter, referred to as other polymerizable monomers).

In the disclosure, the "self-crosslinking silicone oil" refers to a silicone oil having a self-crosslinking group. Specifically, the "self-crosslinking silicone oil" has a polysiloxane as a basic structure, and has a structure in which at least some substituents on side chains and terminals of the polysiloxane are substituted with self-crosslinking groups. The self-crosslinking group refers to a functional group that can form a crosslinked structure in a molecule by itself by an external stimulus such as an electron beam, an ultraviolet ray, or heat even if other components are not present. Examples of the polysiloxane include polydimethylsiloxane, polymethylphenylsiloxane, polydiphenylsiloxane, polymethylhydrogensiloxane, and mixtures thereof. Substituents will be described later.

In the disclosure, a "self-crosslinked product of a self-crosslinking silicone oil" refers to a compound in a state of having a crosslinked structure by a crosslinking reaction of a self-crosslinking group of the self-crosslinking silicone oil in a molecule. The confirmation of having a crosslinked structure can be performed by the presence or absence of dissolution when the self-crosslinked product of the self-crosslinking silicone oil after the self-crosslinking silicone oil coated with the acrylamide-based polymer is self-crosslinked is immersed in tetrahydrofuran. That is, when dissolved, the compound is distinguished as not having a crosslinked structure.

In the disclosure, "having on a surface" may be a state of being attached to the surface. "Attachment" means that the self-crosslinked product of the self-crosslinking silicone oil may be present on the surface of the acrylamide-based polymer fiber, and may be any of a bonding state such as a covalent bond or an ionic bond, a state in which the self-crosslinked products are attracted to each other by van der Waals force, and the like. The self-crosslinked product of the self-crosslinking silicone oil may be present inside the acrylamide-based polymer fiber.

Since the carbon fiber precursor fiber of the disclosure has the above configuration, it is possible to suppress the fusion of single fibers in the stabilization treatment while maintaining a high carbonization yield.

The reason why the above effect is exhibited is presumed as follows, but is not limited thereto.

When the self-crosslinking silicone oil is self-crosslinked, a self-crosslinked product (film) having high heat resistance is formed on the surface of the acrylamide-based polymer fiber. Thus, it is presumed that the single fibers are hardly fused to each other in the stabilization treatment.

In addition, the self-crosslinked product has a chemical structure to which a self-crosslinking group is bonded, and the chemical structure to which the self-crosslinking group is bonded is similar to a chemical structure of the carbon fiber precursor fiber. Therefore, during the stabilization treatment, the self-crosslinked product does not suppress permeation of the oxidizing gas, and hardly inhibits the progress of the stabilization reaction (cyclization, partial oxidation). Furthermore, since the occurrence of fusion between carbon fiber precursor fibers is suppressed, heat and oxidizing gas (oxidation) are easily transferred to the inside of each carbon fiber precursor fiber during the stabilization treatment. As a result, the stabilization reaction (cyclization, partial oxidation) easily proceeds. As a result, the carbonization yield is estimated to be high.

As described above, the carbon fiber precursor fiber of the disclosure can suppress the fusion of single fibers in the stabilization treatment while maintaining a high carbonization yield. Therefore, the carbon fiber precursor fiber of the disclosure can reduce the production cost of the carbon fiber, and a high-quality carbon fiber can be obtained from the carbon fiber precursor fiber of the disclosure.

On the other hand, when a known combination of a silicone-based oil having an amino group and a silicone-based oil having an epoxy group is crosslinked, the obtained crosslinked product contains at least one of a hydroxyl group or an amino group. Therefore, the known crosslinked product is highly likely to inhibit permeation of oxygen. As a result, the progress of the stabilization reaction becomes insufficient, and the carbonization yield is often low.

A known silicone-based oil is used for suppressing fusion between single fibers of polyacrylonitrile fibers or stabilized fibers derived from polyacrylonitrile fibers, and is heat-treated at a high temperature in order to progress a crosslinking reaction. Therefore, as the conventionally known silicone-based oil, a mixture of two or more kinds of silicone-based oils such as an amino group-modified silicone-based oil or an amino group-modified silicone-based oil is used. However, even when the known silicone-based oil is directly developed into a polyacrylamide fiber or a polyacrylamide-based stabilized fiber, the effect of suppressing the fusion of single fibers is low. On the other hand, since the carbon fiber precursor stabilized fiber of the disclosure includes a self-crosslinked product of a self-crosslinking silicone oil, it is possible to suppress fusion between single fibers in the stabilization treatment.

In addition, since the known polyacrylonitrile fiber is lipophilic, the known silicone-based oil needs to be dispersed in an aqueous solution and applied to the polyacrylonitrile fiber. For this purpose, it was essential to adjust the viscosity of the silicone-based oil using a surfactant. On the other hand, since the acrylamide-based polymer fiber in the disclosure is water-soluble, it is not essential to adjust the viscosity of the self-crosslinking silicone oil using a surfactant. It is preferable that the viscosity of the self-crosslinking silicone oil is not adjusted because the surfactant becomes a foreign substance and remains in the carbon fiber precursor resistant fiber, which tends to lead to deterioration of mechanical characteristics.

(1.1) Fineness or the Like of Carbon Fiber Precursor Fiber (1.1.1) Fineness

The fineness of the carbon fiber precursor fiber is not particularly limited, and is preferably from $1\times10^{-8}$ tex/fiber to 100 tex/fiber, more preferably from $1\times10^{-6}$ tex/fiber to 60 tex/fiber, still more preferably from $1\times10^{-3}$ tex/fiber to 40 tex/fiber, particularly preferably from $1\times10^{-2}$ tex/fiber to 10 tex/fiber, even more preferably from $5\times10^{-2}$ tex/fiber to 2 tex/fiber, and most preferably from $3\times10^{-2}$ tex/fiber to 1 tex/fiber.

When the fineness of the carbon fiber precursor fiber is set to $1\times10^{-8}$ tex/fiber or more, the occurrence of yarn breakage is suppressed, and thus the ease of winding the carbon fiber precursor fiber and the stability of the stabilization treatment tend to be improved.

When the fineness of the carbon fiber precursor fiber is 100 tex/fiber or less, a difference in structure between the structure near the surface layer of the carbon fiber obtained by the stabilization treatment and the structure near the center thereof can be reduced, and a tensile strength and a tensile modulus of the carbon fiber tend to be improved.

In the disclosure, in the measurement of the fineness (tex/fiber) of a single fiber, 100 carbon fiber precursor fibers are bundled to prepare a fiber bundle, the mass of the fiber bundle is measured, and the fineness of the single fiber is determined by the following formula.

Fineness (tex) of single fiber=mass (g) of fiber bundle/fiber length (m)×1000/100 (fibers)

(1.1.2) Average Fiber Diameter

The average fiber diameter of the carbon fiber precursor fiber is not particularly limited, and is preferably from 3 nm to 300 μm, more preferably from 30 nm to 250 μm, still more preferably from 1 μm to 200 μm, particularly preferably from 3 μm to 100 μm, even still more preferably from 4 μm to 50 μm, and most preferably from 5 μm to 30 μm.

By setting the average fiber diameter of the carbon fiber precursor fiber to 3 nm or more, the stability of the stabilization treatment tends to be improved. By setting the average fiber diameter of the carbon fiber precursor fiber to 3 nm or more, the occurrence of yarn breakage can be suppressed, and thus the ease of winding the carbon fiber precursor fiber and the stability of the stabilization treatment tend to be improved.

By setting the average fiber diameter of the carbon fiber precursor fiber to 300 μm or less, a difference between the structure near the surface layer of the carbon fiber obtained by the stabilization treatment and the structure near the center thereof can be reduced, and a tensile strength and a tensile modulus of the carbon fiber tend to be improved.

In the disclosure, as the average fiber diameter, 100 carbon fiber precursor fibers are bundled to prepare a fiber bundle, the density of the fiber bundle is measured using a dry automatic densitometer, and the average fiber diameter of single fibers constituting the fiber bundle is determined by the following formula. As the dry automatic densitometer, AccuPic II 1340 manufactured by Micromeritics or a device similar thereto can be used.

$$D=\{(Dt\times4\times1000)/(\rho\times\pi\times n)\}^{1/2}$$

wherein,

D represents an average fiber diameter (μm) of single fibers constituting a fiber bundle, Dt represents the fineness (tex) of the fiber bundle, ρ represents the density (g/cm$^3$) of the fiber bundle, n represents the number of single fibers constituting the fiber bundle.

Note that π is 3.14.

The carbon fiber precursor fiber may be in the form of a fiber bundle (hereinafter, referred to as "carbon fiber precursor fiber bundle"), and is preferably subjected to a stabilization treatment in the form of a carbon fiber precursor fiber bundle. The carbon fiber precursor fiber bundle is obtained by bundling a plurality of carbon fiber precursor fibers.

In the carbon fiber precursor fiber bundle, the number of filaments per bundle is not particularly limited, and is preferably from 50 to 96000, more preferably from 100 to 48000, still more preferably from 500 to 36000, and particularly preferably from 1000 to 24000, from the viewpoint of productivity and mechanical properties of stabilized fibers and carbon fibers.

By setting the number of filaments per bundle to 96000 or less, the occurrence of firing unevenness during the stabilization treatment can be suppressed.

(1.2) Self-Crosslinked Product

The carbon fiber precursor fiber of the disclosure includes a self-crosslinked product of a self-crosslinking silicone oil. The self-crosslinked product is provided on the surface of the acrylamide-based polymer fiber.

As a result, the binding property and handling of the fibers can be improved, and the fusion of the single fibers can be suppressed in the stabilization treatment.

The self-crosslinked product of the self-crosslinking silicone oil may be present in at least a portion of the surface of the acrylamide-based polymer fiber, and from the viewpoint of obtaining a carbon fiber precursor fiber that further suppresses the fusion of single fibers in the stabilization treatment while maintaining a higher carbonization yield, it is preferably attached to the entire surface of the acrylamide-based polymer fiber as a film.

The content of the self-crosslinked product is not particularly limited, and is preferably from 0.1 parts by mass to 20 parts by mass, more preferably from 0.2 parts by mass to 15 parts by mass, and still more preferably from 0.3 parts by mass to 10 parts by mass, with respect to 100 parts by mass of the acrylamide-based polymer fiber.

When the content of the self-crosslinked product is 0.1 parts by mass or more, the self-crosslinked product of the silicone oil can further exhibit the effect of suppressing the fusion of single fibers.

By setting the content of the self-crosslinked product to 20 parts by mass or less, crosslinking of the silicone oil between carbon fiber precursor fibers can be suppressed, and the fusion between single fibers can be suppressed.

The content of the self-crosslinked product can be measured by thermogravimetric analysis, elemental analysis, or the like. In thermogravimetric analysis, the content of the self-crosslinked product can be measured from the content of weight loss.

(1.2.1) Self-Crosslinking Silicone Oil

The self-crosslinking silicone oil contains a self-crosslinking group. The self-crosslinking group refers to a group that produces radical upon external stimulation. In the present invention, the external stimulus is preferably an electron beam, an ultraviolet ray, heat, or the like, and more preferably an electron beam. Specifically, the self-crosslinking group preferably contains at least one of a mono-substituted ethylene group, a 1,1-disubstituted ethylene group, or a 1,2-disubstituted ethylene group.

Examples of the mono-substituted ethylene group include a vinyl group, a vinylcarbonyl group, a vinyl ester group, an acrylic group, an acrylamide group, an allyl group, an allyl ether group, a 4-vinylbenzene group, and a 4-allylbenzene group.

Examples of the 1,1-disubstituted ethylene group include an isopropenyl group, a methacrylic group, a methacrylamide group, and a 4-isopropenylbenzene group.

Examples of the 1,2-disubstituted ethylene group include a maleimide group, a fumaric acid ester group, and a fumaramide group.

Among these self-crosslinking groups, the self-crosslinking group is preferably an acrylic group, a methacrylic group, an acrylamide group, or a methacrylamide group from the viewpoint of affinity with the acrylamide-based polymer, and is more preferably an acrylic group or a methacrylic group from the viewpoint of polymerizability.

The self-crosslinking silicone oil may have a structure in which at least a part of substituents on side chains and terminals of the polysiloxane is substituted with a self-crosslinking group. Examples of the substituent include alkyl groups such as a methyl group, an ethyl group, and a propyl group, and aryl groups such as a phenyl group and a methylphenyl group. Among them, the substituent is more preferably a methyl group or a phenyl group, and still more preferably a methyl group.

The self-crosslinking silicone oil may be a commercially available product.

The viscosity of the self-crosslinking silicone oil at 25° C. is not particularly limited.

The lower limit of the viscosity of the self-crosslinking silicone oil at 25° C. is preferably 9 $mm^2/s$ or more, and more preferably 20 $mm^2/s$ or more, from the viewpoint of efficiently advancing the crosslinking reaction without volatilization during the crosslinking treatment.

The upper limit of the viscosity of the self-crosslinking silicone oil at 25° C. is preferably 100,000 $mm^2/s$ or less, and more preferably 10,000 $mm^2/s$ or less, from the viewpoint of attaching the self-crosslinking silicone oil to the surface of the acrylamide-based polymer fiber with a more uniform film thickness.

The viscosity of the self-crosslinking silicone oil at 25° C. shows the value at 25° C. by the Ubbelohde viscometer.

When the self-crosslinking silicone oil is a commercially available product and has a catalog value, the viscosity of the self-crosslinking silicone oil at 25° C. is a manufacturer's catalog value.

Examples of the self-crosslinking silicone oil include products manufactured by Shin-Etsu Chemical Co., Ltd., products manufactured by Siltech Corporation, and the like. Examples of products manufactured by Shin-Etsu Chemical Co., Ltd. include "X-22-164C", "X-22-164", "X-22-164AS", "X-22-164A", "X-22-164B", "X-22-164E", "X-22-2445", "X-22-174ASX", "X-22-174BX", "KF-2012", "X-22-2426", and "X-22-2404". Examples of products manufactured by Siltech Corporation include "Silmer ACR D2", "Silmer ACR Di-10", "Silmer ACR Di-50", "Silmer ACR Di-400", "Silmer ACR Di-1508", "Silmer OH ACR Di-10", "Silmer OH ACR Di-50", "Silmer OH ACR Di-100", "Silmer OH ACR Di-400", "Silmer OH ACR C50", "Silmer OH ACR C7-F", "Silmer VIN C50", "Silmer VIN J10", "Silmer VIN 70", "Silmer VIN 100", "Silmer VIN 200", and "Silmer VIN 1000".

(1.3) Acrylamide-Based Polymer Fiber

The carbon fiber precursor fiber of the disclosure includes an acrylamide-based polymer fiber, and may include two or more kinds of acrylamide-based polymer fibers.

The acrylamide-based polymer fiber is preferably formed using an acrylamide-based polymer composition. A resin component of the acrylamide-based polymer composition contains an acrylamide-based polymer.

(1.3.1) Acrylamide-Based Polymer

The acrylamide-based polymer may be a homopolymer of an acrylamide-based monomer or may be a copolymer of an acrylamide-based monomer and one or more other monomers other than the acrylamide-based monomer (hereinafter, referred to as other polymerizable monomers).

From the viewpoint of the fusion suppression property, the carbonization yield, the shape stability, the tensile strength of the stabilized fiber, and the like, the acrylamide-based polymer is preferably a copolymer of an acrylamide-based monomer and other polymerizable monomers.

(1.3.1.1) Acrylamide-Based Monomer Unit

The content of the acrylamide-based monomer unit in the acrylamide-based polymer is preferably 30 mol % or more, more preferably 40 mol % or more, still more preferably 50 mol % or more, particularly preferably 55 mol % or more, and most preferably 60 mol % or more, with respect to all the monomer units constituting the copolymer.

When the content of the acrylamide-based monomer unit is 30 mol % or more, the solubility of the acrylamide-based polymer before crosslinking in an aqueous solvent or an aqueous mixed solvent tends to be improved.

The upper limit of the content of the acrylamide-based monomer unit is not particularly limited, and is preferably 99.9 mol % or less, more preferably 99.8 mol % or less, still more preferably 95 mol % or less, particularly preferably 90 mol % or less, and most preferably 85 mol % or less from the viewpoint of fusion suppression property, carbonization yield, and shape stability.

Examples of the acrylamide-based monomer include acrylamide; ethacryl amide; croton amide; itaconic acid diamide; cinnamic acid amide; maleic acid diamide; N-alkylacrylamides such as N-methylacrylamide, N-ethylacrylamide, N-n-propylacrylamide, N-isopropylacrylamide, N-n-butylacrylamide, and N-tert-butylacrylamide; N-cycloalkylacrylamide such as N-cyclohexylacrylamide; dialkylacrylamides such as N,N'-dimethylacrylamide; dialkylaminoalkylacrylamides such as dimethylaminoethylacrylamide and dimethylaminopropylacrylamide; hydroxyalkyl acrylamides such as N-(hydroxymethyl) acrylamide and N-(hydroxyethyl) acrylamide; N-arylacrylamide such as N-phenylacrylamide; diacetone acrylamide; N,N'-alkylene bisacrylamide such as N,N'-methylene bisacrylamide; methacrylamide; N-alkyl methacrylamide such as N-methyl methacrylamide, N-ethyl methacrylamide, N-n-propyl methacrylamide, N-isopropyl methacrylamide, N-n-butyl methacrylamide, and N-tert-butyl methacrylamide; N-cycloalkylmethacrylamide such as N-cyclohexylmethacrylamide; dialkylmethacrylamide such as N,N'-dimethylmethacrylamide; dialkylaminoalkyl methacrylamide such as dimethylaminoethyl methacrylamide and dimethylaminopropyl methacrylamide; hydroxyalkyl methacrylamide such as N-(hydroxymethyl) methacrylamide and N-(hydroxyethyl) methacrylamide; N-arylmethacrylamide such as N-phenylmethacrylamide, diacetone methanolamide; N,N'-alkylene bismethacrylamide such as N,N'-methylene bismethacrylamide.

From the viewpoint of the solubility of the acrylamide-based polymer in the aqueous solvent or the aqueous mixed solvent, among the acrylamide-based monomers described above, acrylamide, N-alkylacrylamide, dialkylacrylamide, methacrylamide, N-alkylmethacrylamide, or dialkylmethacrylamide is preferable, and acrylamide is more preferable.

One kind of the acrylamide-based monomer may be used singly, or two or more kinds thereof may be used in combination.

(1.3.1.2) Another Polymerizable Monomer Unit

When the acrylamide-based polymer is a copolymer of an acrylamide-based monomer and other polymerizable monomers, the content of other polymerizable monomer units in the copolymer is preferably 0.1 mol % or more, more preferably 1 mol % or more, still more preferably 5 mol % or more, particularly preferably 10 mol % or more, and most preferably 15 mol % or more, with respect to all monomer units constituting the copolymer, from the viewpoint of the fusion suppression property, the carbonization yield, and the shape stability.

From the viewpoint of improving the solubility of the acrylamide-based polymer in the aqueous solvent or the aqueous mixed solvent, the upper limit of the content of other polymerizable monomer units is preferably 70 mol % or less, more preferably 60 mol % or less, still more preferably 50 mol % or less, particularly preferably 45 mol % or less, and most preferably 40 mol % or less.

Examples of other polymerizable monomers include a vinyl cyanide monomer, unsaturated carboxylic acid and a salt thereof, unsaturated carboxylic acid anhydride, unsaturated carboxylic acid ester, a vinyl alcohol-based monomer, a vinylcarboxylate monomer, and an olefin-based monomer.

Examples of the vinyl cyanide monomer include acrylonitrile, methacrylonitrile, 2-hydroxyethylacrylonitrile, chloroacrylonitrile, chloromethylacrylonitrile, ethoxyacrylonitrile, and vinylidene cyanide.

Examples of the unsaturated carboxylic acid include acrylic acid, methacrylic acid, maleic acid, fumaric acid, itaconic acid, citraconic acid, mesaconic acid, crotonic acid, and isocrotonic acid.

Examples of the salt of an unsaturated carboxylic acid include a metal salts (for example, sodium salt, potassium salt, or the like), an ammonium salt, and an amine salt of unsaturated carboxylic acid.

Examples of the unsaturated carboxylic anhydride include maleic anhydride and itaconic anhydride.

Examples of the unsaturated carboxylic acid ester include methyl acrylate, methyl methacrylate, 2-hydroxyethyl acrylate, and 2-hydroxyethyl methacrylate.

Examples of the vinyl-based monomer include aromatic vinyl-based monomers such as styrene and α-methylstyrene, vinyl chloride, and vinyl alcohol.

Examples of the olefin-based monomer include ethylene, propylene, isopropylene, and butadiene.

Among the other polymerizable monomers described above, the other polymerizable monomer is preferably a vinyl cyanide monomer and more preferably acrylonitrile from the viewpoint of the spinnability, the fusion suppression property, the carbonization yield, and the shape stability of the acrylamide-based polymer.

Among the other polymerizable monomers described above, from the viewpoint of the solubility of the copolymer before crosslinking in the aqueous solvent or the aqueous mixed solvent, the other polymerizable monomer is preferably an unsaturated carboxylic acid and a salt thereof, and more preferably acrylic acid, maleic acid, fumaric acid, or itaconic acid.

Among the other polymerizable monomers described above, the other polymerizable monomer is preferably an unsaturated carboxylic acid or an unsaturated carboxylic anhydride, and more preferably acrylic acid, maleic acid, fumaric acid, itaconic acid, or maleic anhydride from the viewpoint of the fusion suppression property, the carbonization yield, and the shape stability.

The other polymerizable monomers described above may be used singly or in combination of two or more thereof.

From the viewpoint of the solubility of the copolymer in the aqueous solvent or the aqueous mixed solvent, the spinnability, the fusion suppression, the carbonization yield, and the shape stability, the acrylamide-based polymer is particularly preferably a copolymer of an acrylamide-based monomer, a vinyl cyanide monomer, and an unsaturated carboxylic acid, and most preferably a copolymer of acrylamide, acrylonitrile, and acrylic acid.

From the viewpoint of the spinnability, the fusion suppression property, the carbonization yield, and the shape stability, the content of the vinyl cyanide monomer unit in the copolymer is preferably from 0.1 mol % to 50 mol %, more preferably from 1 mol % to 45 mol %, and still more preferably from 5 mol % to 40 mol %.

From the viewpoint of the solubility of the copolymer in the aqueous solvent or the aqueous mixed solvent, the fusion suppression property, the carbonization yield, and the shape stability, the content of the unsaturated carboxylic acid monomer unit in the copolymer is preferably from 0.1 mol % to 50 mol %, more preferably from 0.1 mol % to 40 mol %, still more preferably from 0.1 mol % to 30 mol %, particularly preferably from 1 mol % to 30 mol %, and most preferably from 2 mol % to 20 mol %.

Among them, the acrylamide-based polymer fiber contains a copolymer, and the copolymer preferably contains from 40 mol % to 99.8 mol % of an acrylamide-based monomer unit, from 0.1 mol % to 50 mol % of a vinyl cyanide monomer unit, and from 0.1 mol % to 30 mol % of an unsaturated carboxylic acid-based monomer unit with respect to all monomer units constituting the copolymer.

From the viewpoint of the fusion suppression property, the carbonization yield, and the shape stability, the content of the acrylamide-based polymer with respect to the mass of the carbon fiber precursor fiber of the disclosure is preferably from 80 mass % to 99.9 mass %, and more preferably from 85 mass % to 99.7 mass %.

The acrylamide-based polymer preferably has an infrared absorption peak to be observed in the range of about 1644 $cm^{-1}$ to 1653 $cm^{-1}$.

The infrared absorption peak is an absorption peak derived from the stretching motion of the carbonyl group in the acrylamide-based monomer unit.

The infrared absorption spectrum is measured using infrared spectroscopy.

Specifically, an infrared absorption spectrum is measured by an attenuated total reflection (ATR) method in which a measurement range is from 400 $cm^{-1}$ to 4000 $cm^{-1}$, a resolution is 193 $m^{-1}$, and the number of integrations is 32.

As the measuring device, for example, a Fourier transform infrared spectroscope "Nicolet iS20" manufactured by Thermo Scientific or a similar device can be used.

(1.4) Additive Component

The carbon fiber precursor fiber of the disclosure can contain at least one additive component selected from the group consisting of acid and a salt thereof.

Since the carbon fiber precursor fiber is excellent in the fusion suppression property, the carbonization yield, and the shape stability, the carbon fiber precursor fiber does not need to contain an additive component such as acid, and the carbon fiber precursor fiber (that is, the acrylamide-based polymer composition) may contain at least one additive component selected from the group consisting of acid and a salt thereof in addition to the acrylamide-based polymer. By subjecting the carbon fiber precursor fiber containing the additive component to a stabilization treatment, formation of a cyclic structure by a dehydration reaction, a deammonia reaction, or the like is accelerated, and the fusion suppression property, the carbonization yield, and the shape stability tend to be further improved.

In the stabilized fiber, at least a part of the additive component and the residue thereof may remain. Furthermore, the carbonization treatment may be performed by adding an additive component to the stabilized fiber.

Examples of the acid include inorganic acids such as phosphoric acid, polyphosphoric acid, boric acid, sulfuric acid, nitric acid, and carbonic acid, and organic acids such as oxalic acid, citric acid, and sulfonic acid.

Examples of the acid salt include metal salts (sodium salt, potassium salt, or the like), ammonium salts, amine salts, and guanidine salts, and urea salts, and imidazole salts, and ammonium salts and amine salts are preferable, and ammonium salts are more preferable.

Among the above-described additive components, phosphoric acid, polyphosphoric acid, boric acid, polyboric acid, sulfuric acid, or ammonium salts thereof are preferable, phosphoric acid, polyphosphoric acid, boric acid or ammonium salts thereof are more preferable, and phosphoric acid, polyphosphoric acid, ammonium salts of phosphoric acid or ammonium salts of polyphosphoric acid are still more preferable from the viewpoint of the fusion suppression property, the carbonization yield, and the shape stability.

The content of the additive component is preferably from 0.1 parts by mass to 100 parts by mass, more preferably from 0.2 parts by mass to 50 parts by mass, still more preferably from 0.5 parts by mass to 30 parts by mass, and particularly preferably from 1 part by mass to 20 parts by mass with respect to 100 parts by mass of the acrylamide-based polymer contained in the carbon fiber precursor fiber from the viewpoint of the carbonization yield, the fusion suppression property, and the shape stability.

(2) Fiber for Carbon Fiber Precursor Fiber

The fiber for carbon fiber precursor fiber according to the disclosure includes an acrylamide-based polymer fiber and an uncrosslinked product of a self-crosslinking silicone oil on a surface of the acrylamide-based polymer fiber.

The content of the uncrosslinked product is not particularly limited, and is preferably from 0.1 parts by mass to 20 parts by mass, more preferably from 0.2 parts by mass to 15 parts by mass, and still more preferably from 0.3 parts by mass to 10 parts by mass, with respect to 100 parts by mass of the acrylamide-based polymer fiber.

When the content of the uncrosslinked product is 0.1 parts by mass or more, the silicone oil after self-crosslinking can further exhibit the effect of suppressing the fusion of single fibers.

By setting the content of the uncrosslinked product to 20 parts by mass or less, crosslinking of the silicone oil between carbon fiber precursor fibers can be suppressed during self-crosslinking, and the fusion between single fibers can be suppressed.

A method of measuring the content of the uncrosslinked product is the same as the method described in examples.

In the disclosure, the "fiber for a carbon fiber precursor fiber" refers to a precursor fiber of the carbon fiber precursor fiber that has not been subjected to a crosslinking treatment, a stabilization treatment, and a carbonization treatment. When the fiber for a carbon fiber precursor fiber is subjected to a crosslinking treatment, it becomes a carbon fiber precursor fiber. The carbon fiber precursor fiber itself is not directly subjected to either the stabilization treatment or the carbonization treatment.

In the disclosure, the "uncrosslinked product of a self-crosslinking silicone oil" refers to a self-crosslinking silicone oil in a state where the self-crosslinking silicone oil is not crosslinked.

Since the fiber for a carbon fiber precursor fiber of the disclosure has the above configuration, when the self-crosslinking silicone oil is self-crosslinked, it is possible to suppress the fusion of single fibers in the stabilization treatment while maintaining a high carbonization yield.

The fiber for a carbon fiber precursor fiber of the disclosure has the same configuration as the carbon fiber precursor fiber of the disclosure except that the self-crosslinking silicone oil is not self-crosslinked.

(3) Method of Producing Carbon Fiber Precursor Fiber

The method of producing a carbon fiber precursor fiber according to the present disclosure includes a step of subjecting a fiber for a carbon fiber precursor fiber to be described later to a crosslinking treatment (hereinafter, referred to as a "crosslinking treatment step").

With this, a carbon fiber precursor fiber of the disclosure can be obtained.

The method of producing a carbon fiber precursor fiber may include a step of preparing a fiber for a carbon fiber precursor fiber (hereinafter, "preparation step") in addition to the crosslinking treatment step. The preparation step is performed before the crosslinking treatment step.

Hereinafter, a case where the method of producing a carbon fiber precursor fiber includes a preparation step and a crosslinking treatment step will be described.

(3.1) Preparation Step

In the preparation step, a fiber for carbon fiber precursor fiber is prepared. Thus, the fiber for a carbon fiber precursor fiber of the disclosure is obtained.

The method of preparing the fiber for a carbon fiber precursor fiber is not particularly limited, and examples thereof include a method in which an acrylamide-based polymer composition is spun, a self-crosslinking silicone oil is applied to the obtained acrylamide-based polymer fiber, and the self-crosslinking silicone oil is self-crosslinked.

(3.1.1) Acrylamide-Based Polymer Composition

The acrylamide-based polymer composition is a raw material of the acrylamide-based polymer fiber.

The acrylamide-based polymer composition contains an acrylamide-based polymer, and if necessary, contains the above-described additive components and the like.

As the acrylamide-based polymer, a commercially available polymer may be used, or a polymer synthesized by a conventionally known method in the related art may be used.

The acrylamide-based polymer can be synthesized by utilizing a known polymerization reaction such as radical polymerization, cationic polymerization, anionic polymerization, or living radical polymerization. Among the above polymerization reactions, radical polymerization is preferable from the viewpoint of reducing the synthesis cost.

The acrylamide-based polymer can be synthesized by using a polymerization method such as solution polymerization, suspension polymerization, precipitation polymerization, dispersion polymerization, or emulsion polymerization (for example, inverse emulsion polymerization).

When the acrylamide-based polymer is synthesized by solution polymerization, it is preferable to use, as the solvent, a solvent in which the monomer of the raw material and the acrylamide-based polymer to be obtained are dissolved, it is more preferable to use an aqueous solvent or an aqueous mixed solvent, and it is still more preferable to use an aqueous solvent from the viewpoint of safe synthesis at low cost.

Examples of the aqueous solvent include water, alcohols, and mixed solvents thereof, and water is particularly preferable.

The aqueous mixed solvent means a mixed solvent of the aqueous solvent and an organic solvent, and examples of the organic solvent include tetrahydrofuran.

In the synthesis of the acrylamide-based polymer by radical polymerization, it is preferable to use a polymerization initiator.

As the polymerization initiator, the conventionally known radical polymerization initiators in the related art such as azobisisobutyronitrile, benzoyl peroxide, 4,4'-azobis(4-cyanovaleric acid), ammonium persulfate, and potassium persulfate can be used.

When an aqueous solvent or an aqueous mixed solvent is used as the solvent, a radical polymerization initiator soluble in an aqueous solvent or an aqueous mixed solvent such as 4,4'-azobis(4-cyanovaleric acid), ammonium persulfate, or potassium persulfate is preferable.

From the viewpoint of reducing the molecular weight of the acrylamide-based polymer and improving the spinnability of the acrylamide-based polymer, it is preferable to use at least one of polymerization accelerators or a molecular weight modifier in place of the polymerization initiator or together with the polymerization initiator, and it is more preferable to use the polymerization initiator and the polymerization accelerator in combination.

Examples of the polymerization accelerator include tetramethylethylenediamine.

Examples of the molecular weight modifier include an alkyl mercaptan compound such as n-dodecyl mercaptan.

It is particularly preferable to use ammonium persulfate as a polymerization initiator and tetramethylethylenediamine as a polymerization accelerator in combination.

The temperature of the polymerization reaction is not particularly limited, and is preferably 35° C. or higher, more preferably 40° C. or higher, still more preferably 50° C. or higher, and particularly preferably 70° C. or higher from the viewpoint of improving the spinnability of the acrylamide-based polymer.

The acrylamide-based polymer may be a homopolymer of an acrylamide-based monomer, or may be a copolymer of an acrylamide-based monomer and one or more other polymerizable monomers. Preferred embodiments of the acrylamide-based monomer and other polymerizable monomers have been described above, and thus the description thereof is omitted here.

The content of the acrylamide-based monomer unit in the acrylamide-based polymer is preferably 30 mol % or more, more preferably 40 mol % or more, still more preferably 50 mol % or more, particularly preferably 55 mol % or more, and most preferably 60 mol % or more.

When the content of the acrylamide-based monomer unit is 30 mol % or more, the solubility in an aqueous solvent or an aqueous mixed solvent tends to be improved.

The upper limit of the content of the acrylamide-based monomer unit is not particularly limited, and is preferably 99.9 mol % or less, more preferably 99.8 mol % or less, still more preferably 95 mol % or less, particularly preferably 90 mol % or less, and most preferably 85 mol % or less from the viewpoint of fusion suppression property, carbonization yield, and shape stability.

When the acrylamide-based polymer is a copolymer of an acrylamide-based monomer and one or more other polymerizable monomers, the content of the other monomer units in the copolymer is preferably 0.1 mol % or more, more preferably 1 mol % or more, still more preferably 5 mol % or more, particularly preferably 10 mol % or more, and most preferably 15 mol % or more, from the viewpoint of the fusion suppression property, the carbonization yield, and the shape stability.

From the viewpoint of improving the solubility of the acrylamide-based polymer in the aqueous solvent or the aqueous mixed solvent, the upper limit of the content of other monomer units is preferably 70 mol % or less, more preferably 60 mol % or less, still more preferably 50 mol %, particularly preferably 45 mol % or less, and most preferably 40 mol % or less.

Examples of the method of producing the acrylamide-based polymer composition include a method of directly mixing an additive component with a molten acrylamide-based polymer (melt mixing), a method of dry-blending an acrylamide-based polymer and an additive component (dry mixing), or a method of immersing or passing an acrylamide-based polymer formed into fibers in an aqueous solution or an aqueous mixture solution containing an additive component, or a solution in which an acrylamide-based polymer is not completely dissolved, but the additive component is dissolved or a dispersion in which the additive component is dispersed.

When the acrylamide-based polymer and the additive component are soluble in the aqueous solvent or the aqueous mixed solvent, from the viewpoint that the acrylamide-based polymer and the additive component can be uniformly mixed, a method of mixing the acrylamide-based polymer and the additive component in the aqueous solvent or the aqueous mixed solvent (wet mixing) is preferable.

The wet mixing may be performed by mixing the additive component in the aqueous solvent in which the acrylamide-based polymer was synthesized or in the aqueous mixed solvent.

In the wet mixing, it is preferable to use an aqueous solvent as the solvent, and it is more preferable to use water from the viewpoint that the acrylamide-based polymer composition can be produced safely at a lower cost.

When the acrylamide-based polymer composition is produced by wet mixing, the solvent may or may not be removed. The method of removing the solvent is not particularly limited, and at least one of known methods such as distillation under reduced pressure, reprecipitation, hot air drying, vacuum drying, and freeze drying can be used.

(3.1.2) Spinning

The method of spinning the acrylamide-based polymer composition is not particularly limited, and may be performed, for example, by melt-spinning, spunbonding, melt-blowing, or centrifugal spinning a melt of the acrylamide-based polymer composition.

When the acrylamide-based polymer composition is soluble in an aqueous solvent or an aqueous mixed solvent, the acrylamide-based polymer composition is preferably dissolved in an aqueous solvent or an aqueous mixed solvent and spun using the obtained aqueous solution or aqueous mixed solution to produce an acrylamide-based polymer fiber from the viewpoint of the spinnability, environmental impact reduction, cost, and safety.

When the acrylamide-based polymer is synthesized by solution polymerization, it is preferable that a solution of the acrylamide-based polymer is adjusted to a desired concentration as necessary and then spun to produce an acrylamide-based polymer fiber.

When the acrylamide-based polymer composition is produced by wet mixing, it is preferable that a solution of an acrylamide-based polymer composition is adjusted to a desired concentration as necessary and then spun to produce an acrylamide-based polymer fiber.

The spinning is preferably performed by a dry spinning method, a wet spinning method, a dry-wet spinning method, a gel spinning method, a flash spinning method, or an electrospinning method. According to the spinning method, an acrylamide-based polymer fiber having desired fineness and average fiber diameter can be safely produced at low cost.

It is preferable to use an aqueous solvent as the solvent, and it is more preferable to use water from the viewpoint that the acrylamide-based polymer fiber can be produced safely at lower cost.

(3.1.3) Attachment

The method of attaching the self-crosslinking silicone oil to the acrylamide-based polymer fiber is not particularly limited, and examples thereof include a coating method, an immersion method, a spraying method, a touch roll method, and a guide oil supply method using a self-crosslinking silicone-based oil (hereinafter, may be referred to as an "oil")

(3.1.3.1) Self-Crosslinking Silicone-Based Oil

The oil contains a self-crosslinking silicone oil. The oil may be a self-crosslinking silicone oil singly, or may contain a self-crosslinking silicone oil and an organic solvent for diluting the self-crosslinking silicone oil. The organic solvent is a good solvent for the self-crosslinking silicone oil and a poor solvent for the acrylamide-based polymer. In addition, an oil containing no self-crosslinking group or an oil containing a functional group other than the self-crosslinking group may be contained as long as the effect of the invention is not impaired.

The viscosity of the oil at 25° C. is not particularly limited, and is similar to the range exemplified as the viscosity of the self-crosslinking silicone oil at 25° C.

The viscosity of the self-crosslinking silicone-based oil at 25° C. is a value of 25° C. measured with the Ubbelohde viscometer. When the self-crosslinking silicone-based oil is a commercially available product of a self-crosslinking silicone oil, the viscosity of the self-crosslinking silicone oil at 25° C. may be a manufacturer's catalog value.

The oil may contain, in addition to the organic solvent, a smoothing agent, a moisture absorbent, a surfactant, a viscosity modifier, a release agent, a spreading agent, an antibacterial agent, a preservative, and the like as necessary.

(3.2) Crosslinking Treatment Step

In the crosslinking treatment step, the carbon fiber precursor fiber is subjected to a crosslinking treatment. With this, a carbon fiber precursor fiber can be obtained.

The fiber for a carbon fiber precursor fiber may be subjected to the crosslinking treatment in the form of a fiber bundle.

(3.2.1) Crosslinking Treatment

The crosslinking treatment is not particularly limited as long as it can self-crosslink the self-crosslinking silicone oil contained in the acrylamide-based polymer fiber, and examples thereof include a method of irradiating the oil contained on the surface of the acrylamide-based polymer fiber with an electron beam (hereinafter, referred to as "electron beam treatment"), a method of irradiating the oil contained on the surface of the acrylamide-based polymer fiber with ultraviolet rays, and a method of heating and drying the oil contained on the surface of the acrylamide-based polymer fiber. Among them, the crosslinking treatment is preferably an electron beam treatment from the viewpoint of energy efficiency and a treatment speed.

(3.2.1.1) Electron Beam Treatment

From the viewpoint of the fusion suppression property, the carbonization yield, and the shape stability, the dose of the electron beam with which the acrylamide-based polymer fiber is irradiated is preferably from 50 kGy to 10,000 kGy, more preferably from 100 kGy to 5000 kGy, and still more preferably from 150 kGy to 1000 kGy.

The preferable numerical range of the dose described above is a preferable numerical range of the dose when the acrylamide-based polymer fiber is irradiated with an electron beam from one direction, and when the acrylamide-based polymer fiber is irradiated from two or more directions, the numerical range is not limited to the above, and is preferably appropriately adjusted.

When an electron beam is used as the active energy ray, the dose is measured by using a film dosimeter. As the film dosimeter, the FTR-125 manufactured by FUJIFILM Co., an FWT-60 type manufactured by Toyo Medic Co., Ltd. or a device similar thereto can be used.

From the viewpoint of the fusion suppression property, the carbonization yield, and the shape stability, an acceleration voltage of the electron beam with which the acrylamide-based polymer fiber is irradiated is preferably adjusted to an acceleration voltage at which preferably 20% or more, more preferably 60% or more, and still more preferably 80% or more of the irradiated active energy ray is transmitted through the acrylamide-based polymer fiber.

When the electron beam is used as the active energy ray, the transmittance of the electron beam can be calculated from the difference in dose between the front surface (before transmission) and the back surface (after transmission) of the sample. In addition, it may be calculated from a relationship diagram between a transmission depth and the relative dose that is generally disclosed.

Specifically, the acceleration voltage is preferably from 10 kV to 10 MV, more preferably from 100 kV to 3 MV, and still more preferably from 150 kV to 1 MV.

The preferable numerical range of the acceleration voltage described above is a preferable numerical range of the acceleration voltage when the acrylamide-based polymer fiber is irradiated with an active energy ray from one direction, and when the acrylamide-based polymer fiber is irradiated from two or more directions, the numerical range is not limited to the above, and is preferably appropriately adjusted.

The electron beam irradiation may be performed in a batch manner or in a continuous manner.

The apparatus used for irradiation with an active energy ray is not particularly limited, but when irradiation with an active ray by a batch method is performed, CB250/30/20 mA manufactured by Iwasaki Electric Co., Ltd. or an apparatus similar thereto can be used. When continuous irradiation with an active energy ray is performed, an electron beam irradiation apparatus EBC800-35 manufactured by NHV Corporation or an apparatus similar thereto can be used.

(4) Method of Producing Stabilized Fiber

The method of producing a stabilized fiber of the disclosure includes a step (hereinafter, referred to as a "stabilization treatment step") of subjecting a carbon fiber precursor fiber to a stabilization treatment.

As a result, a high carbonization yield can be maintained, and a stabilized fiber in which fusion between single fibers is suppressed can be obtained.

The acrylamide-based polymer fiber is hardly thermally decomposed by the stabilization treatment. Furthermore, the structure of the acrylamide/vinyl cyanide/unsaturated carboxylic acid copolymer is converted into a structure having high heat resistance by the stabilization treatment. Therefore, the carbonization yield is high.

In particular, in an acrylamide-based polymer fiber containing an additive component, the deammonification reaction and dehydration reaction of the acrylamide/vinyl cyanide/unsaturated carboxylic acid copolymer are promoted by the catalytic action of an acid as an additive component and a salt thereof. Therefore, a cyclic structure (imide ring structure) or a structure in which two or more polycyclic rings are continuous in the molecule of the acrylamide-based polymer fiber is easily formed. As a result, the structure of the acrylamide/vinyl cyanide/unsaturated carboxylic acid copolymer is easily converted into a structure having high heat resistance. As a result, the carbonization yield is even higher.

In the disclosure, the "stabilization treatment" means that the carbon fiber precursor fiber is subjected to a heat treatment in an oxidizing gas atmosphere.

(4.1) Stabilization Treatment

The temperature of the stabilization treatment is not particularly limited, and is preferably from 150° C. to 500° C., more preferably from 200° C. to 450° C., and still more preferably from 250° C. to 420° C.

The temperature includes not only a maximum temperature (stabilization treatment temperature) at the time of the stabilization treatment described later but also a temperature in a temperature raising process up to the stabilization treatment temperature.

The maximum temperature during the stabilization treatment (stabilization treatment temperature) is preferably from 200° C. to 500° C., more preferably from 250° C. to 450° C., still more preferably from 305° C. to 440° C., particularly preferably from 310° C. to 430° C., and most preferably from 315° C. to 420° C.

By setting the stabilization treatment temperature to 200° C. or higher, the deammonia reaction and dehydration reaction of the acrylamide/vinyl cyanide/unsaturated carboxylic acid copolymer are easily promoted, and a cyclic structure (imide ring structure) is easily formed in the molecule. Therefore, the heat resistance and the carbonization yield of the stabilized fiber tend to be improved.

When the stabilization treatment temperature is 500° C. or lower, the stabilized fiber is less likely to be thermally decomposed, and the production cost tends to be reduced.

The stabilization treatment time (heating time at the stabilization treatment temperature) is not particularly limited, and is preferably from 1 minute to 120 minutes, more preferably from 2 minutes to 60 minutes, still more preferably from 3 minutes to 50 minutes, and particularly preferably from 4 minutes to 40 minutes, from the viewpoint of the carbonization yield and the production cost.

By setting the stabilization treatment time to 1 minute or more, the carbonization yield can be improved.

By setting the stabilization treatment time to 120 minutes or less, the production cost can be reduced.

(4.2) Drawing Treatment

In the stabilization treatment of the carbon fiber precursor fiber, the carbon fiber precursor fiber is preferably subjected to a drawing treatment. When the carbon fiber precursor fiber is subjected to the drawing treatment, the acrylamide-based polymer contained in the carbon fiber precursor fiber tends to be oriented to improve the tensile strength of the stabilized fiber.

The drawing treatment is preferably performed at least during heating at the stabilization treatment temperature.

From the viewpoint of improving the tensile strength of the stabilized fiber, the drawing treatment is preferably performed also in the temperature raising process up to the stabilization treatment temperature.

The tension applied to the carbon fiber precursor fiber during the drawing treatment is preferably from 0.03 mN/tex to 500 mN/tex, more preferably from 0.05 mN/tex to 400 mN/tex, still more preferably from 0.07 mN/tex to 200 mN/tex, and particularly preferably from 0.1 mN/tex to 100 mN/tex.

When the tension applied to the carbon fiber precursor fiber is less than 0.05 mN/tex, the fusion between single fibers is not sufficiently suppressed, and the load resistance, strength, and carbonization yield of the stabilized fiber at a high temperature tend to decrease.

When the tension applied to the carbon fiber precursor fiber exceeds 200 mN/tex, the carbon fiber precursor fiber may be cut during the stabilization treatment.

In the disclosure, the tension (unit: mN/tex) applied to the carbon fiber precursor fiber refers to a value obtained by dividing the tension (unit: mN) applied to the carbon fiber precursor fiber during the stabilization treatment by the fineness (unit: tex) of the carbon fiber precursor fiber in an absolutely dry state, that is, the tension per unit fineness of the carbon fiber precursor fiber.

The tension can be adjusted by adjusting the speed at an inlet and an outlet of a heating device such as a stabilization furnace or by using a load cell, a spring, a weight, pneumatic cylinder, or the like.

As long as a predetermined tension is applied to the acrylamide-based polymer fiber at the stabilization treatment temperature (the maximum temperature during the stabilization treatment), the predetermined tension may or may not be applied in the temperature raising process or the like up to the stabilization treatment temperature, but from the viewpoint of sufficiently obtaining the effect by applying the tension, the predetermined tension is preferably applied also in the temperature raising process or the like. In addition, the tension may be applied from an initial stage such as a temperature raising process, or may be applied from an intermediate stage.

In the method of producing a stabilized fiber of the invention, a heat treatment may be performed while a predetermined tension is applied at the stabilization treatment temperature (the maximum temperature during the stabilization treatment), and then a heat treatment may be performed while a tension other than the predetermined tension is applied or without applying a tension at a temperature higher than the stabilization treatment temperature.

(4.3) Stabilized Fiber

A density of the stabilized fiber is not particularly limited, and is preferably from 1.30 g/cm$^3$ to 1.75 g/cm$^3$, more preferably from 1.35 g/cm$^3$ to 1.70 g/cm$^3$, still more preferably from 1.37 g/cm$^3$ to 1.65 g/cm$^3$, particularly preferably from 1.39 g/cm$^3$ to 1.60 g/cm$^3$, and most preferably from 1.44 g/cm$^3$ to 1.55 g/cm$^3$.

When the density of the stabilized fiber is 1.30 g/cm$^3$ or more, the heat resistance and the denseness of the structure of the stabilized fiber are sufficient. Therefore, the carbonization yield tends to be improved.

When the density of the stabilized fiber is 1.75 g/cm$^3$ or less, the productivity of the stabilized fiber is excellent.

The average fiber diameter of the stabilized fiber is not particularly limited, and is preferably from 3 nm to 300 μm, more preferably from 30 nm to 150 μm, still more preferably from 1 μm to 60 μm, even more preferably from 2 μm to 30 μm, particularly preferably from 3 μm to 20 μm, and most preferably from 4 μm to 15 μm from the viewpoint of the tensile strength of the obtained carbon fiber.

From the viewpoint of the carbonization yield, the average fiber diameter of the stabilized fibers is preferably 5% or more smaller, more preferably 10% or more smaller, still more preferably 15% or more smaller, even more preferably 20% or more smaller, particularly preferably 25% or more smaller, and most preferably 30% or more smaller than the average fiber diameter of the carbon fiber precursor fibers.

(5) Method of Producing Carbon Fiber

The method of producing a carbon fiber of the disclosure includes a step of obtaining a stabilized fiber by a method of producing a stabilized fiber; and a step of subjecting the stabilized fiber to a carbonization treatment (hereinafter, referred to as a "carbonization treatment step"). With this, a carbon fiber can be obtained.

In the disclosure, the term "carbonization treatment" refers to a treatment for carbonizing a carbon fiber precursor fiber, and specifically refers to subjecting the carbon fiber precursor fiber to a heat treatment in a low oxygen atmosphere (preferably an environment in which oxygen is blocked).

(5.1) Step of Obtaining Stabilized Fiber

The step of obtaining a stabilized fiber is the same as the method exemplified as the method of producing a stabilized fiber.

(5.2) Carbonization Treatment Step (5.2.1) Carbonization Treatment

Examples of the carbonization treatment include a method of subjecting the stabilized fiber to a heat treatment at a temperature higher than the temperature in the stabilization treatment under an inert gas (nitrogen, argon, helium, or the like) atmosphere. The "carbonization treatment" may include "graphitization" generally performed by heating at from 2,000° C. to 3,000° C. under an inert gas atmosphere. By subjecting the stabilized fiber to the carbonization treatment, the stabilized fiber is carbonized to obtain a carbon fiber.

The lower limit of the heating temperature in the carbonization treatment is preferably 500° C. or higher, more preferably 1,000° C. or higher, still more preferably 1,100° C. or higher, particularly preferably 1,200° C. or higher, and most preferably 1,300° C. or higher.

The upper limit of the heating temperature in the carbonization treatment is preferably 3,000° C. or lower, and more preferably 2,500° C. or lower.

The heating time of the carbonization treatment is not particularly limited, and is preferably 30 seconds to 60 minutes, and more preferably 1 minute to 30 minutes.

In the disclosure, the "carbonization treatment" may generally include "graphitization" performed by heating at a temperature of from 2,000° C. to 3,000° C. under an inert gas atmosphere.

The carbonization treatment may include a plurality of times of heat treatment.

In the carbonization treatment, a plurality of heat treatments may be performed. For example, it is possible to first perform a heat treatment (preliminary carbonization treatment) at a temperature of lower than 1,000° C., then perform a heat treatment (carbonization treatment) at a temperature of 1,000° C. or higher, and further perform a heat treatment (graphitization treatment) at a temperature of 2,000° C. or higher.

(5.3) Carbon Fiber

The average fiber diameter of the carbon fiber is not particularly limited, and is preferably from 3 nm to 300 μm, more preferably from 30 nm to 150 μm, still more preferably from 1 μm to 60 μm, particularly preferably from 3 μm to 20 μm, still more preferably from 4 μm to 15 μm, and most preferably from 5 μm to 10 μm from the viewpoint of the tensile strength.

Since the average fiber diameter of the carbon fibers is 3 nm or more, when a composite material is produced using a resin or the like as a matrix, if the viscosity of the matrix is high, insufficient impregnation of the resin or the like into the carbon fiber bundle hardly occurs, and the tensile strength of the composite material is improved.

When the average fiber diameter of the carbon fibers is 300 μm or less, the tensile strength of the carbon fibers tends to be less likely to decrease.

EXAMPLES

Hereinafter, the above-described embodiments will be specifically described with reference to examples, but the above-described embodiments are not limited to these examples.

<Fineness of Single Fiber of Acrylamide-Based Polymer Fiber>

In the present Example, the fineness of the single fiber of the acrylamide-based polymer fiber was obtained by bundling 100 obtained acrylamide-based polymer fibers to prepare a fiber bundle, measuring the mass of the fiber bundle, and calculating the fineness (tex) of the single fiber by the following formula.

$$\text{Fineness (tex) of single fiber}=\text{mass (g) of fiber bundle}/\text{fiber length (m)}\times 1000/100\ \text{(fibers)}$$

<Average Fiber Diameter of Acrylamide-Based Polymer Fiber>

In the present examples, the average fiber diameter of the acrylamide-based polymer fibers was determined in such a manner that 100 obtained acrylamide-based polymer fibers were bundled to prepare a fiber bundle, the density (g/cm$^3$) of the fiber bundle was measured using a dry automatic densitometer ("AccuPic II 1340" manufactured by Micromeritics), and the average fiber diameter (μm) of single fibers constituting the fiber bundle was determined by the following formula.

$$D=\{(Dt\times 4\times 1000)/(\rho\times\pi\times n)\}^{1/2}$$

wherein,

D represents an average fiber diameter (μm) of single fibers constituting a fiber bundle, Dt represents the fineness (tex) of the fiber bundle, ρ represents the density (g/cm$^3$) of the fiber bundle, n represents the number of single fibers constituting the fiber bundle.

Example 1

A monomer composition containing 63 mol % of acrylamide (AM), 35 mol % of acrylonitrile (AN), and 2 mol % of acrylic acid (AA) was prepared.

100 parts by mass of monomer composition and 4 parts by mass of tetramethylethylenediamine were dissolved in 567 parts by mass of distilled water to obtain an aqueous solution.

While the obtained aqueous solution was stirred in a nitrogen atmosphere, 3 parts by mass of ammonium persulfate was added to the aqueous solution, and the mixture was heated at 70° C. for 150 minutes, then heated to 90° C. over 30 minutes, and held at 90° C. for 1 hour to perform a polymerization reaction.

The obtained aqueous solution was added dropwise to methanol to precipitate an AM/AN/AA copolymer, and the copolymer was recovered and vacuum-dried at 100° C. for 12 hours to obtain an AM/AN/AA copolymer (AM/AN/AA=63 mol %/35 mol %/2 mol %).

The obtained AM/AN/AA copolymer was dissolved in deionized water to form an aqueous solution, and then dry-spun so as to have 0.4 tex/fiber of fineness and an average fiber diameter of about 20 μm to obtain an acrylamide-based polymer fiber. Next, a self-crosslinking silicone oil ("X-22-164C" manufactured by Shin-Etsu Chemical Co., Ltd., self-crosslinking group:methacrylic group) (temperature: 25° C.) was applied to the entire surface of the acrylamide-based polymer fiber to obtain a single fiber. 800 single fibers obtained were bundled to obtain a fiber bundle (800 single fibers/bundle).

Using an electron beam irradiation apparatus "EBC800-35" manufactured by NHV Corporation, the fiber bundle was subjected to a continuous electron beam treatment under the conditions of a conveyance speed of 10 m/min, a feed tension of 75 g, a winding tension of 400 g, an acceleration voltage of 800 kV in the atmosphere, and an electron beam dose of 1100 kGy. With this, a carbon fiber precursor fiber bundle can be obtained.

Example 2

A carbon fiber precursor fiber bundle was obtained in the same manner as in Example 1 except that the acceleration voltage was changed to 400 kV and the electron beam dose was changed to 300 kGy as the treatment conditions of the electron beam treatment.

Comparative Example 1

A carbon fiber precursor fiber bundle was obtained in the same manner as in Example 1 except that the fiber bundle was not subjected to the electron beam treatment.

Comparative Example 2

A carbon fiber precursor fiber bundle was obtained in the same manner as in Example 1 except that the acrylamide-based polymer fiber was not coated with the self-crosslinking silicone oil.

Comparative Example 3

A carbon fiber precursor fiber bundle was obtained in the same manner as in Example 1 except that the self-crosslinking silicone oil was changed to a non-self-crosslinking silicone oil A (polydimethylsiloxane, self-crosslinking group: none, non-self-crosslinking group: none), and the fiber bundle was not subjected to an electron beam treatment.

In the disclosure, the non-self-crosslinking group is a group in which at least a part of methyl groups of side chains and terminals of polydimethylsiloxane is substituted, and represents an organic group that is not a self-crosslinking group.

Comparative Example 4

A carbon fiber precursor fiber bundle was obtained in the same manner as in Example 1 except that the self-crosslinking silicone oil was changed to a non-self-crosslinking silicone oil A.

Comparative Example 5

A carbon fiber precursor fiber bundle was obtained in the same manner as in Example 1 except that the self-crosslinking silicone oil was changed to a non-self-crosslinking silicone oil B ("X-22-164C" manufactured by Shin-Etsu Chemical Co., Ltd., self-crosslinking group: none, non-self-crosslinking group: an amino group), and the fiber bundle was not subjected to an electron beam treatment.

<<Measurement of Oil Attachment Amount>>

Each of the carbon fiber precursor fiber bundles obtained in Examples 1 and 2 and Comparative Examples 1 to 5 was cut out in a certain amount to obtain a test piece. The test piece was immersed in a solvent (for example, tetrahydrofuran) in which silicone oil was dissolved without dissolving a test piece. The test piece was taken out from the solvent, and the solvent was completely removed under reduced pressure to obtain a residue. The amount of the oil attached to each of the carbon fiber precursor fibers was calculated from the following formula.

Oil attachment amount (parts by mass)=[mass (g) of residue/mass (g) of dried test piece after removal of oil]×100

(Stabilization Treatment)

Under an air atmosphere, the carbon fiber precursor fiber bundle obtained in each of Examples 1 and 2 and Comparative Examples 1 to 5 was heated from room temperature to 350° C. at a rate of 10° C./min while applying a tension of 0.4 mN/tex to the carbon fiber precursor fiber bundle, and then the carbon fiber precursor fiber bundle was held at 350° C. for 30 minutes to be subjected to a stabilization treatment. With this, a stabilized fiber bundle was obtained.

<<Measurement of Fusion Rate>>

The stabilized fiber bundle was cut with a cutter, and the cross section was observed with a digital microscope ("Digital Microscope VHX-7000" manufactured by Keyence Corporation).

A fiber having a fiber diameter expected from the carbon fiber precursor fiber bundle was defined as a single fiber, a fiber thicker than the fiber diameter expected due to fusion of two or more single fibers was defined as a fused fiber, and a 100 fraction of the ratio of the number of single fibers contained in the fused fiber to the number of observed fibers (200 in terms of single fibers) was defined as a fusion rate. The measurement results of the fusion rate are shown in Table 1. The acceptable range of the fusion rate is 20% or less.

<<Measurement of Carbonization Yield>>

The stabilized fiber bundle was heated from room temperature to 1000° C. at 20° C./min in a nitrogen atmosphere to obtain a carbon bundle. A 100 fraction of a value obtained by dividing the mass of the carbon fiber bundle by the mass of the stabilized fiber bundle before the carbonization treatment was defined as a carbonization yield. The measurement results of the carbonization yield are shown in Table 1. The acceptable range of the carbonization yield is 70% or more.

TABLE 1

| | Carbon fiber precursor fiber | | | | Crosslinking treatment step | | Stabilized fiber | Carbon fiber |
|---|---|---|---|---|---|---|---|---|
| | Silicone oil | | | Oil attachment amount (% by mass) | Acceleration voltage (kV) | Electron beam dose (kGy) | Fusion rate (%) | Carbonization yield (%) |
| | Types | Self-crosslinking group | Non-self-crosslinking group | | | | | |
| Example 1 | Self-crosslinking | Methacrylic group | — | 2.8 | 800 | 1100 | 14 | 71 |
| Example 2 | Self-crosslinking | Methacrylic group | — | 2.8 | 400 | 300 | 19 | 74 |
| Comparative Example 1 | Self-crosslinking | Methacrylic group | — | 2.8 | — | — | >90 | 68 |
| Comparative Example 2 | — | — | — | — | 800 | 1100 | 33 | 65 |
| Comparative Example 3 | Non-self-crosslinking | — | — | 2.7 | — | — | 78 | 63 |
| Comparative Example 4 | Non-self-crosslinking | — | — | 2.7 | 800 | 1100 | 26 | 65 |
| Comparative Example 5 | Non-self-crosslinking | — | Amino group | 2.3 | — | — | >90 | 67 |

The carbon fiber precursor fiber of Comparative Example 1 includes an acrylamide-based polymer fiber polymer fiber and an uncrosslinked product of a self-crosslinking silicone oil.

The carbon fiber precursor fiber of Comparative Example 2 includes an acrylamide-based polymer fiber subjected to an electron beam treatment.

The carbon fiber precursor fiber of Comparative Example 3 includes an acrylamide-based polymer fiber and a coating film of a non-self-crosslinking silicone oil A not subjected to the electron beam treatment.

The carbon fiber precursor fiber of Comparative Example 4 includes an acrylamide-based polymer fiber and a coating film of a non-self-crosslinking silicone oil A subjected to the electron beam treatment.

The carbon fiber precursor fiber of Comparative Example 5 includes an acrylamide-based polymer fiber polymer fiber and a coating film of a non-self-crosslinking silicone oil B.

However, the carbon fiber precursor fibers of Comparative Examples 1 to 5 did not contain a self-crosslinked product of a self-crosslinking silicone oil. Therefore, in Comparative Examples 1 to 5, the fusion rate was more than 20%, and the carbonization yield was less than 70%. From these results, it was found that the carbon fiber precursor fibers of Comparative Examples 1 to 5 were not able to suppress the fusion of single fibers in the stabilization treatment while maintaining a high carbonization yield.

From the measurement results of Comparative Example 1 and Comparative Example 2, when the acrylamide-based polymer fiber coated with the self-crosslinking silicone oil was not subjected to an electron beam treatment, or when the acrylamide-based polymer fiber not coated with the self-crosslinking silicone oil was subjected to an electron beam treatment, the fusion rate was 30% or more, and it was not possible to sufficiently reduce the fusion rate.

From the measurement results of Comparative Example 4, when the acrylamide-based polymer fiber coated with the non-self-crosslinking silicone oil was subjected to an electron beam treatment, the fusion rate was 26% or more, and a sufficient single fiber was not obtained.

From the measurement results of Comparative Example 3 and Comparative Example 5, when the acrylamide-based polymer fiber coated with the non-self-crosslinking silicone oil was not subjected to an electron beam treatment, the fusion rate was 78% or more, and a sufficient single fiber was not obtained.

The carbon fiber precursor fibers of Example 1 and Example 2 include an acrylamide-based polymer fiber polymer fiber and a self-crosslinked product of a self-crosslinking silicone oil. Therefore, in Examples 1 and 2, the fusion rate was 20% or less, and the carbonization yield was 70% or more. From these results, it was found that the carbon fiber precursor fibers in Example 1 and Example 2 were able to suppress the fusion of single fibers in the stabilization treatment while maintaining a high carbonization yield.

What is claimed is:

1. A carbon fiber precursor fiber, comprising:
an acrylamide-based polymer fiber; and
a self-crosslinked product of a self-crosslinking silicone oil on a surface of the acrylamide-based polymer fiber.

2. The carbon fiber precursor fiber according to claim 1, wherein a content of the self-crosslinked product is from 0.1 parts by mass to 20 parts by mass with respect to 100 parts by mass of the acrylamide-based polymer fiber.

3. The carbon fiber precursor fiber according to claim 1, wherein:
the acrylamide-based polymer fiber is formed of an acrylamide-based polymer, and
the acrylamide-based polymer contains 30 mol % or more of an acrylamide-based monomer unit with respect to all monomer units configuring the acrylamide-based polymer.

4. The carbon fiber precursor fiber according to claim 3, wherein the acrylamide-based polymer contains from 40 mol % to 99.8 mol % of the acrylamide-based monomer unit, from 0.1 mol % to 50 mol % of a vinyl cyanide monomer unit, and from 0.1 mol % to 30 mol % of an unsaturated carboxylic acid-based monomer unit, with respect to all monomer units configuring the acrylamide-based polymer.

5. The carbon fiber precursor fiber according to claim 1, wherein the self-crosslinking silicone oil has an acrylic group or a methacrylic group.

6. The carbon fiber precursor fiber according to claim 1, wherein the self-crosslinking silicone oil has a viscosity of 9 $mm^2/s$ or more at 25° C.

7. A fiber for carbon fiber precursor fiber, comprising:
an acrylamide-based polymer fiber; and
an uncrosslinked product of a self-crosslinking silicone oil on a surface of the acrylamide-based polymer fiber.

8. A method of producing a carbon fiber precursor fiber, the method comprising:
subjecting the fiber for the carbon fiber precursor fiber according to claim 7 to a crosslinking treatment.

9. The method of producing a carbon fiber precursor fiber according to claim 8, wherein the crosslinking treatment is an electron beam treatment.

10. A method of producing a stabilized fiber, the method comprising:
subjecting the carbon fiber precursor fiber according to claim 1 to a stabilization treatment.

11. A method of producing a carbon fiber, the method comprising:
obtaining a stabilized fiber by the method of producing a stabilized fiber according to claim 10; and
subjecting the stabilized fiber to a carbonization treatment.

* * * * *